United States Patent

Ryu

Patent Number: 5,420,748
Date of Patent: May 30, 1995

[54] SURFACE MOUNTING TYPE CHIP CAPACITOR

[75] Inventor: Yang S. Ryu, Suwon, Rep. of Korea

[73] Assignee: Samsung Electro-Mechanics Co., Ltd., Suwon, Rep. of Korea

[21] Appl. No.: 218,087

[22] Filed: Mar. 25, 1994

[30] Foreign Application Priority Data

Mar. 31, 1993 [KR] Rep. of Korea ............... 1993-5317

[51] Int. Cl.$^6$ ............................................. H01G 9/10
[52] U.S. Cl. ....................................... 361/537; 361/535
[58] Field of Search ........................ 361/535–538, 361/519, 518; 174/52.5; 29/25.03

[56] References Cited

U.S. PATENT DOCUMENTS 4,931,961  6/1990  Ando ................................. 361/535

FOREIGN PATENT DOCUMENTS 0033914  2/1989  Japan ................................. 361/536
0089510  4/1991  Japan ................................. 361/535

Primary Examiner—Bruce A. Reynolds
Assistant Examiner—Michael D. Switzer
Attorney, Agent, or Firm—Webb Ziesenheim Bruening Logsdon Orkin & Hanson

[57] ABSTRACT

The invention discloses an upstanding surface mounting type electrolytic chip capacitor. The conventional capacitor has an asymmetrical mass distribution, and oscillations occur, with the result that an automatic surface mounting becomes difficult. The present invention provides upward projections along the edges of the cover portion of the holder, thereby minimizing the settling instability, and forming a plurality of soldering gas discharge and lead guide slots. Further, an annular groove is formed on the bottom of the cover portion and along the upper circumference of the capacitor, so that a short-circuit preventing step should be formed, and that the coupling between the capacitor and the holder should be reinforced. Accordingly, the lead drawing direction does not have to be considered, and the mass distribution of the capacitor becomes symmetrical. Therefore, when the surface mounting type chip capacitor is dropped from a suction-holding means onto a circuit board, the capacitor is settled at the exact position, thereby preventing the positional deviations.

6 Claims, 4 Drawing Sheets

SURFACE MOUNTING TYPE CHIP CAPACITOR

FIELD OF THE INVENTION

The present invention relates to a surface mounting type chip capacitor which is suitable for automatically mounting on the surface of a circuit board.

BACKGROUND OF THE INVENTION

Owing to the progress of the assembling techniques for electronic apparatuses, the assembling of circuit boards, which constitutes a large portion of the assembling of electronic apparatuses, is carried out by automatically inserting or soldering the electronic components.

Among the surface mounting type chip components, transistors, resistors, small capacitors of less than 1 $\mu$F and the like can be easily fabricated in the form of chip, while the radial type aluminum electrolytic capacitor of over 1 $\mu$F requires a high technique in fabricating it in the form of chip. Conventionally, when the radial type aluminum electrolytic capacitor is made in the form of chip, it is molded with a resin, and the molding is cured. In the molding and curing process, the characteristics of the capacitor can be altered, the leads can be oscillated, and other defects can occur, thereby making it difficult to obtain a satisfactory result.

As such problems are exposed, various new techniques have been proposed.

FIG. 1 illustrates a chip capacitor consisting of a holder 20 and a radial type aluminum electrolytic capacitor 10. The shape of the interior of the holder 20 is cylindrical, so that it should be suitable to surround the capacitor. On the top of the holder, there is an insulating cover 25 which covers a part of the top of it, and which is integrally formed with the holder 20. Thus a semi-circular opening 24 is provided. A T shaped lead guide 26 having a step is provided on the insulating cover 25, while cut-away portions 27 are formed at the corners of the top portion of the holder 20, the dimensions of the cut-away portions 27 being equivalent to the thickness and width of a pair of leads 13.

Thus the radial type aluminum electrolytic capacitor 10 is inserted from the bottom 23 of the holder 20 into the cylindrical space. The pair of the leads 13 which are drawn over an insulating rubber 11 are bent along the T shaped lead guide 26, and are further bent along the cut-away portions 27, thereby completing the final chip type electrolytic capacitor. Here, the insulating cover 25 serves the function of preventing a short-circuit between the leads 13 and an aluminum cover 12 which is provided on the top of the capacitor 10.

Such a chip capacitor is laid down in the lengthwise posture, and therefore, the contact area between a rear face 22 of the capacitor and the surface of the circuit board is enlarged. Therefore, there is a high probability that the chip capacitor may be laid down over the other electronic components of the circuit board. Accordingly, the setting becomes such that the positional security is not assured. Further, the leads are bent several times, the assembling of the chip capacitor becomes complicated, and a complicated jig for this is required.

Particularly, the total surface 21 of the holder 20 is suction-held by a pneumatic means in order to mount the chip capacitor on the circuit board, and thus, the capacitor is dropped onto the relevant portion of the circuit board. However, the mass of the capacitor is asymmetrically distributed, and therefore, when the dropping is made, the setting cannot be made to the exact position, thereby causing a positional deviation defect. That is, the leads 13 which are bent along the cut-away portions 27 are frequently deviated from the exact position of the circuit board.

Further, when the leads 13 of the above described capacitor are soldered, the opposite side is lifted, and therefore, a particular measure is required for the mechanical oscillations.

FIG. 2 illustrates another conventional chip capacitor. In this device, a holder 40 is installed on the upper portion of the capacitor for drawing leads 33 of an aluminum electrolytic capacitor 30. The holder 40 is provided with a through-hole 41 for drawing out the leads 33 of the capacitor 30, and is also provided with a pair of lead guides 42. The lead guides 42 extend from the through-hole 41 outwardly, and their dimensions are equivalent to the thickness and width of the leads. Further, for the identification of the polarity of the capacitor, one side of it is provided with a projected portion 44, and the other side is provided with a cut face 43.

This capacitor is very simple in its constitution, but the coupling between the capacitor 30 and the holder 40 is very weak. Therefore, the oscillations of the leads are very severe, while it is not provided with a gas discharge hole on the top of the holder for discharging the soldering gas which is produced during the soldering after the surface mounting, thereby producing imperfect solderings.

The common problems encountered in the chip capacitor of FIG. 1 and that of FIG. 2 are as follows. That is, if there are pockmarks or a mass of foreign material near the relevant portion of the circuit board, the soldering becomes imperfect due to the lifting phenomenon of the chip capacitor.

Summary of the invention

It is the object of the present invention to provide a surface mounting type chip capacitor in which all the above described disadvantages of the conventional techniques are overcome.

In achieving the object, the radial type capacitor according to the present invention includes: an opening formed at the center of a cover of a holder for pass-through of capacitor leads, the holder having side walls, and being for surrounding the upper portion of the capacitor; a plurality of upward projections formed along the edges of the upper portion of the cover of the holder for forming a plurality of gas discharge and lead guide slots and an internal space; and an annular groove formed on the bottom of the cover of the holder and along the circumference of the capacitor.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
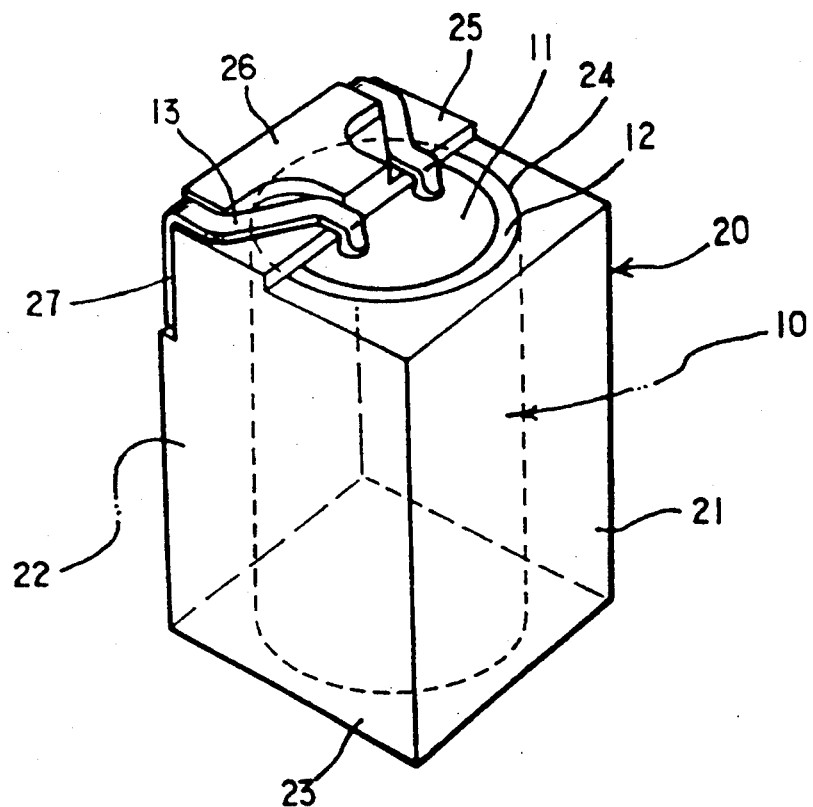
FIG. 1 is a perspective view showing the structure of a conventional chip capacitor.
Figure 2:
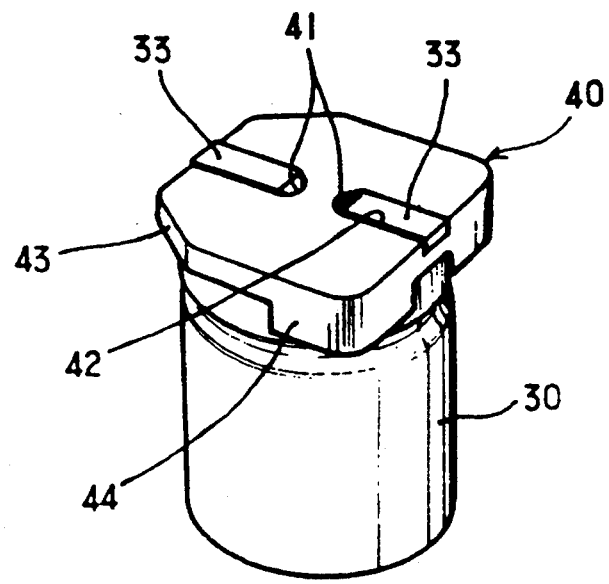
FIG. 2 is a perspective view showing the structure of another conventional chip capacitor.
Figure 3:
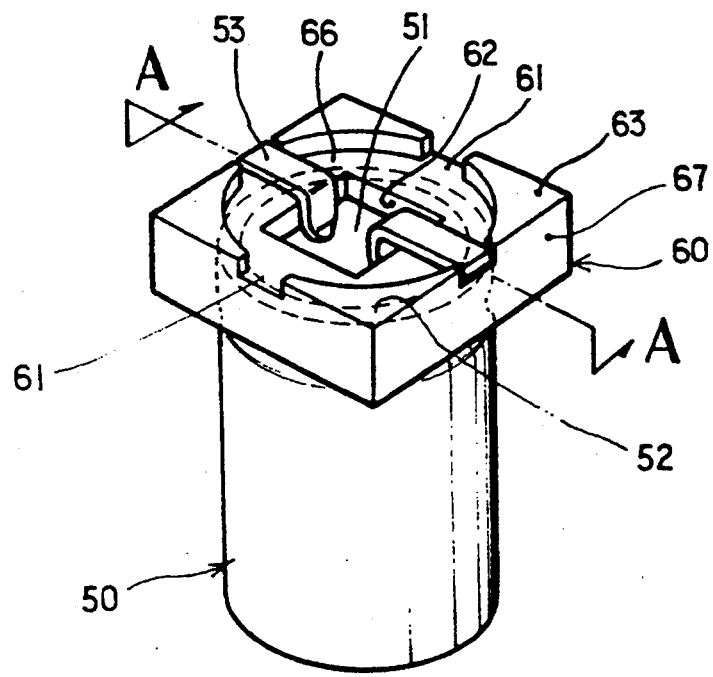
FIG. 3 is a perspective view showing the structure of a first embodiment of the chip capacitor according to the present invention.
Figure 4:
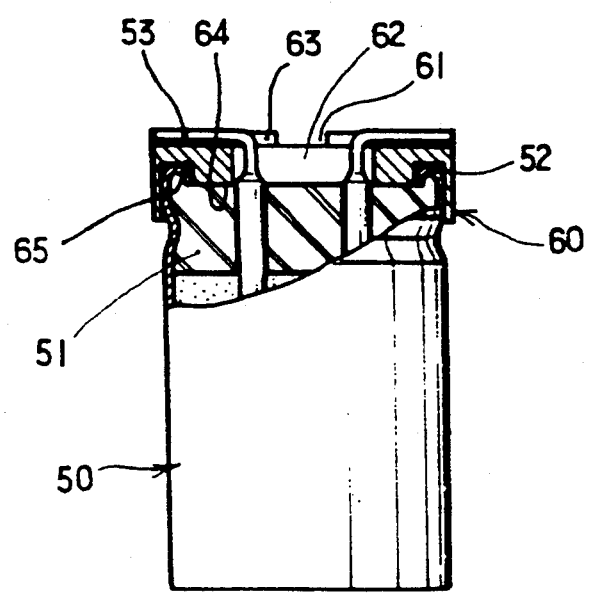
FIG. 4 is a sectional view taken along the line A—A of FIG. 3.

FIG. 3 is a perspective view showing the assembled structure of a first embodiment of the chip capacitor according to the present invention, and FIG. 4 is a sectional view taken along the line A—A of FIG. 3.

Referring to these drawings, a holder 60 which is provided with side walls 67 surrounds a radial type capacitor 50, and the interior of the holder 60 is cylindrical so as for it to be fit to the outer circumference of the capacitor 50, while the holder 60 is provided with a cover portion 66.

An opening 62 which is for pass-through of leads 53 of the capacitor 50 is formed at the center of the cover portion 66 of the holder 60. Along the edges of the top of the cover portion 66, there are provided a plurality of upward projections 63 which are designed to occupy the minimum areas.

The plurality of the upward projections 63 form a plurality of gas discharge and lead guide slots 61 and an internal space.

Thus the pair of leads 53 which are drawn through the central opening 62 of the holder 60 are bent so as for the leads to pass through the gas discharge and lead guide slots 61, thereby completing the chip capacitor.

The rest of the lead guide slots 61 serve as gas discharge holes for gases which are produced when the chip capacitor is soldered on the circuit board.

The plurality of the upward projections 63 which are formed along the edges of the top of the cover portion 66 are made to occupy the minimum areas, within such a range that the security of the settling of the capacitor should not be disturbed. Therefore, a relatively large space is formed on the cover portion 66 by the upward projections 63. This large internal space accommodates relatively large amount of pockmarks or foreign materials, with the result that the lifting phenomenon of the chip capacitor is minimized.

Further, an annular groove 65 is formed on the bottom of the cover portion 66 of the holder 60 (which is coupled with the capacitor 50) along the circumference 52 of the top of the capacitor 50. Thus a short-circuit preventing step 64 is formed on the bottom of the cover portion 66.

The short-circuit preventing step 64 closely contacts with an insulating rubber 51 of the capacitor 50. When the leads 53 are bent along the gas discharge and lead guide slot 61, the short-circuit preventing step 64 is pressed to the insulating rubber 51 to receive an elastic force from the insulating rubber 51. Therefore the holder 60 maintains a tight coupling with the capacitor 50 through the bent portions of the leads 53 and the insulating rubber 51.

During the soldering of the chip capacitor, the short-circuit preventing step 64 completely blocks the flow path for the soldering lead, so that the soldering lead cannot reversely flow along the leads 53, and cannot contact with the cover of the aluminum capacitor. Thus a short-circuit between the capacitor leads and the capacitor cover cannot occur, and therefore, the soldering defect is assuredly prevented.

Figure 5:
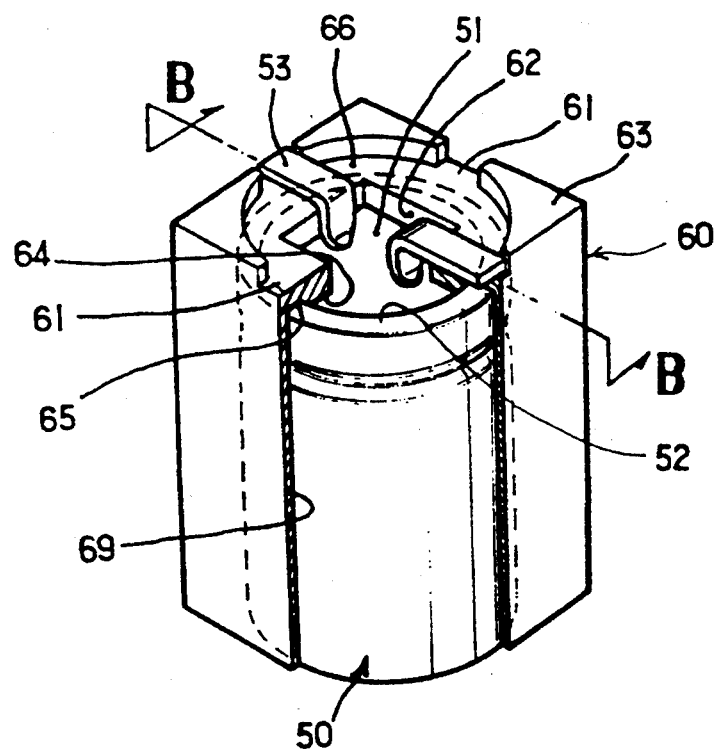
FIG. 5 is a perspective view showing the structure of a second embodiment of the chip capacitor according to the present invention.
Figure 6:
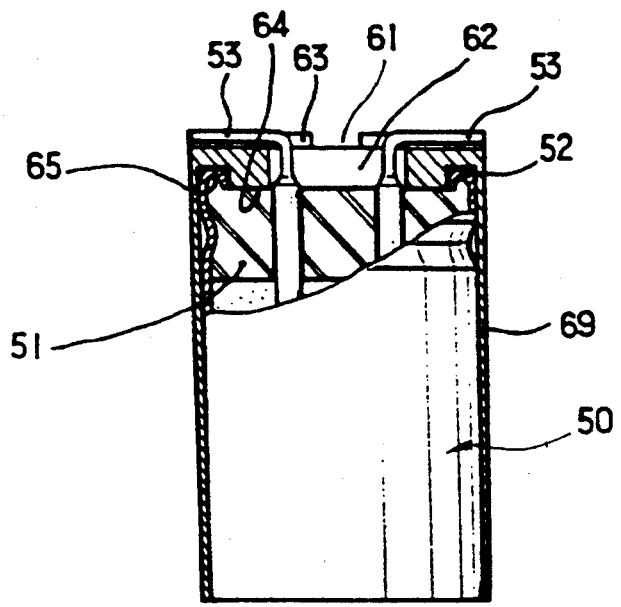
FIG. 6 is a sectional view taken along the line B—B of FIG. 5.

FIGS. 5 and 6 illustrate a second embodiment of the present invention.

Referring to these drawings, a side wall 67 of the holder 60 totally covers the capacitor 50, thereby forming a body portion 69. This structure absorbs the thermal impact which is imposed on the capacitor during the soldering, and therefore, this type of capacitor has a high thermal blocking effect.

Figure 7:
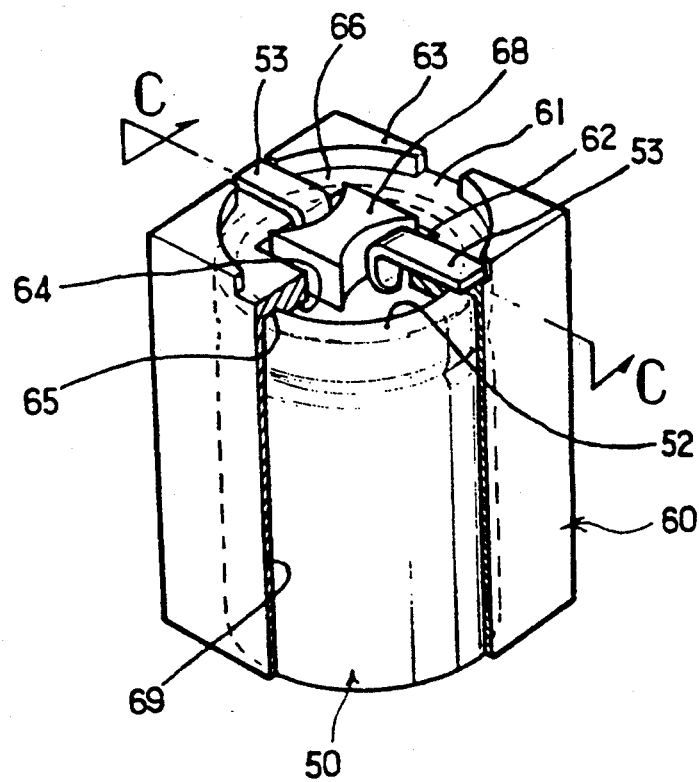
FIG. 7 is a perspective view showing the structure of a third embodiment of the chip capacitor according to the present invention.
Figure 8:
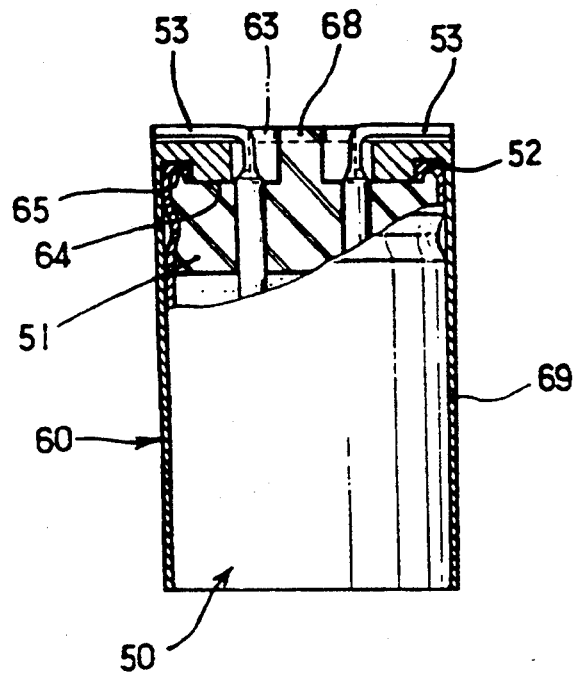
FIG. 8 is a sectional view taken along the line C—C of FIG. 7.

FIGS. 7 and 8 illustrate a third embodiment of the present invention.

Referring to these drawings, this embodiment includes a short-circuit preventing wall 68 which upwardly extends from the insulating rubber 51 up to the level of the top of the upward projections 63 which are formed along the edges of the top of the cover portion 66. That is, the short-circuit preventing wall 68 is provided on the insulating rubber 51 and between the leads 53 of the capacitor 50.

Therefore, the short-circuit preventing wall 68 which extends from the insulating rubber 51 of the capacitor 50 completely isolates the two leads 53 from each other, and therefore, any short-circuit is completely excluded during the soldering.

According to the present invention as described above, the capacitor structure is symmetrical, and therefore, when carrying out the assembling of the capacitor such as the drawing of the leads and the bending of the leads, the assembling efficiency is improved.

Further, in addition to the coupling strength between the holder and the capacitor through the leads, the coupling strength is reinforced through coupling between the upper circumference of the capacitor and the annular groove of the bottom of the cover portion, with the result that a secure stabilized assembling state is realized.

Further, the upward projections which are to be contacted with the circuit board accommodates pockmarks and foreign materials existing on the circuit board, so that the lifting phenomenon of the chip capacitor should be minimized. Further, when the suction-held chip capacitor is dropped onto the circuit board for soldering, the capacitor drops to the exact position, because the mass of the holder is symmetrically distributed, thereby preventing positional deviations.

Particularly, a sufficient space is formed around the leads, and gas discharge slots are formed, so that the soldering gas should be easily discharged during the soldering. Further, the short-circuit preventing wall is provided on the capacitor, and the short-circuit preventing step is provided on the holder, so that any short-circuit between the lead and the lead and between the leads and the outer case of the capacitor should be prevented, thereby markedly reducing the soldering defect.

What is claimed is:

1. A surface mounting type chip capacitor, comprising: a capacitor 50 and a holder 60, said holder comprising:

a cover portion 66 having side walls 67 surrounding a part of an upper portion of said capacitor 50;

an opening 62 formed at the center of said cover portion 66 for pass-through of two leads 53, after being extended from an insulating rubber 51;

a plurality of upward projections 63 formed along with edges of said cover portion 66 for providing a plurality of gas discharge and lead guide slots 61 and an internal space; and wherein said cover portion 66 has an annular groove 65 formed on a bottom of said cover portion 66 of said holder 60 and along a curved portion 52 of an upper circumference of said capacitor 50, thereby forming a short-circuit preventing step 64.

2. The surface mounting type chip capacitor as claimed in claim 1, wherein said holder 60 further extends from said side wall 67 to cover the whole body of said capacitor 50, thereby forming a body portion 69.

3. The surface mounting type chip capacitor as claimed in claim 1 further comprising a short-circuit preventing wall 68, said short-circuit preventing wall 68 extending from said insulating rubber 51 and provided between said two leads 53 of said capacitor.

4. A surface mounting type chip capacitor including a capacitor 50 and a holder 60, said holder having a mass symmetrically distributed about a vertical axis and further comprising:

a cover portion 66 having side walls 69 surrounding said capacitor, and wherein said cover portion has an opening 62 formed in an upper surface thereof for pass-through of two leads 53, said cover portion further including four spaced-apart projections 63 formed along upper edges of said cover portion and extending outwardly from said upper surface for forming a plurality of gas discharge and lead guide slots 61 positioned intermediate said projections and forming an internal space defined between the said projections and the upper surface of said cover portion.

5. The surface mounting type chip capacitor as claimed in claim 4, wherein an annular groove 65 is formed on a bottom of said cover portion 66 of said holder 60 and along a curved portion 52 of an upper circumference of said capacitor 50, thereby forming a short-circuit preventing step 64.

6. The surface mounting type chip capacitor as claimed in claim 4, further comprising a short-circuit preventing wall 68, said short-circuit preventing wall 68 extending from an insulating rubber 51 of said capacitor 50 positioned between said two leads 53 of said capacitor and protruding upwardly through said opening 62 of said cover portion 66 to a level substantially the same as said four projections 63.

* * * * *